United States Patent [19]

Yasuda et al.

[11] Patent Number: 4,852,934
[45] Date of Patent: Aug. 1, 1989

[54] ATTITUDE CONTROL APPARATUS FOR ONBOARD SEAT

[75] Inventors: Tomio Yasuda, Kasukabe; Kohji Aoki, Nagoya, both of Japan

[73] Assignee: Aisin Seiki Kabushiki Kaisha, Japan

[21] Appl. No.: 128,447

[22] Filed: Dec. 3, 1987

[30] Foreign Application Priority Data

Dec. 4, 1986 [JP] Japan ................. 61-289622

[51] Int. Cl.⁴ ............ B60N 1/02; A47C 15/00; B60Q 1/00
[52] U.S. Cl. ................. 296/65.1; 297/257; 340/425.5
[58] Field of Search ............ 296/64, 65 R, 65.1; 297/257, 330, 344, 361; 248/396, 419, 421, 422, 429, 430; 340/52 E; 364/424

[56] References Cited

U.S. PATENT DOCUMENTS

| | | | |
|---|---|---|---|
| 1,719,815 | 7/1929 | Thompson | 297/257 |
| 2,714,521 | 8/1955 | Graham | 292/144 |
| 2,924,265 | 2/1960 | Himka | 296/65 R |
| 3,722,615 | 3/1973 | Okada et al. | 180/112 |
| 3,864,668 | 2/1975 | Bickford | 340/52 E |
| 3,871,474 | 3/1975 | Tomlinson et al. | 180/112 |
| 3,912,939 | 10/1975 | Quantz et al. | 340/52 E |
| 3,943,376 | 3/1976 | Long | 307/116 |
| 4,264,849 | 4/1981 | Fleischer et al. | 297/330 X |
| 4,422,521 | 12/1983 | Mochida | 180/271 |
| 4,467,252 | 12/1982 | Takeda et al. | 297/330 X |
| 4,657,105 | 4/1987 | Miyada | 180/274 |
| 4,669,780 | 6/1987 | Sakakibara et al. | 296/64 X |
| 4,678,058 | 7/1987 | Wooters | 180/273 |
| 4,709,776 | 12/1987 | Metz | 180/281 |
| 4,719,775 | 1/1988 | Pross et al. | 70/264 |
| 4,722,550 | 2/1988 | Imaoka et al. | 280/727 |
| 4,730,120 | 3/1988 | Okada | 307/10 AT |
| 4,785,907 | 11/1988 | Aoki et al. | 180/274 |

FOREIGN PATENT DOCUMENTS

| | | | |
|---|---|---|---|
| 0191272 | 8/1986 | European Pat. Off. | 296/65 R |
| 3508515 | 9/1986 | Fed. Rep. of Germany | 297/330 |
| 55-95787 | 7/1980 | Japan . | |
| 57-15008 | 1/1982 | Japan . | |
| 57-138414 | 8/1982 | Japan . | |
| 57-169528 | 11/1982 | Japan . | |
| 57-186512 | 11/1982 | Japan . | |
| 58-11275 | 1/1983 | Japan . | |
| 58-16918 | 1/1983 | Japan . | |
| 0089429 | 5/1983 | Japan | 297/330 |
| 58-146677 | 9/1983 | Japan . | |
| 59-96369 | 2/1984 | Japan . | |
| 60-88661 | 1/1985 | Japan . | |
| 60-143164 | 7/1985 | Japan . | |
| 60-174314 | 7/1985 | Japan . | |
| 205523 | 11/1986 | Japan . | |

Primary Examiner—Andres Kashnikow
Assistant Examiner—Timothy Newholm
Attorney, Agent, or Firm—Banner, Birch, McKie & Beckett

[57] ABSTRACT

The attitude (as well as the position) of a front one of onboard seats which are disposed one behind the other is controlled. To secure a space for allowing an occupant to be seated upon the rear seat, a retracting limit of an entire front seat and a rear tilting limit for its seat back are determined experimentarily to define an extent of variable attitudes. When an occupant is seated upon the rear seat, the attitude of the front seat is controlled responsive to a command to change the attitude while making a reference to the extent of variable attitudes. A retracting movement of the entire front seat which goes beyond the rear limit as well as a rearward tilting or reclining of the seat back of the front seat which goes beyond the rear tilting limit are both inhibited. In this manner, when an occupant is seated upon the rear seat, the comfortableness of such occupant is secured if the driver carelessly enters a command to change the attitude of the front seat, while preventing any oppression presented to the physical body or causing a stressed attitude of the occupant seated upon the rear seat.

7 Claims, 10 Drawing Sheets

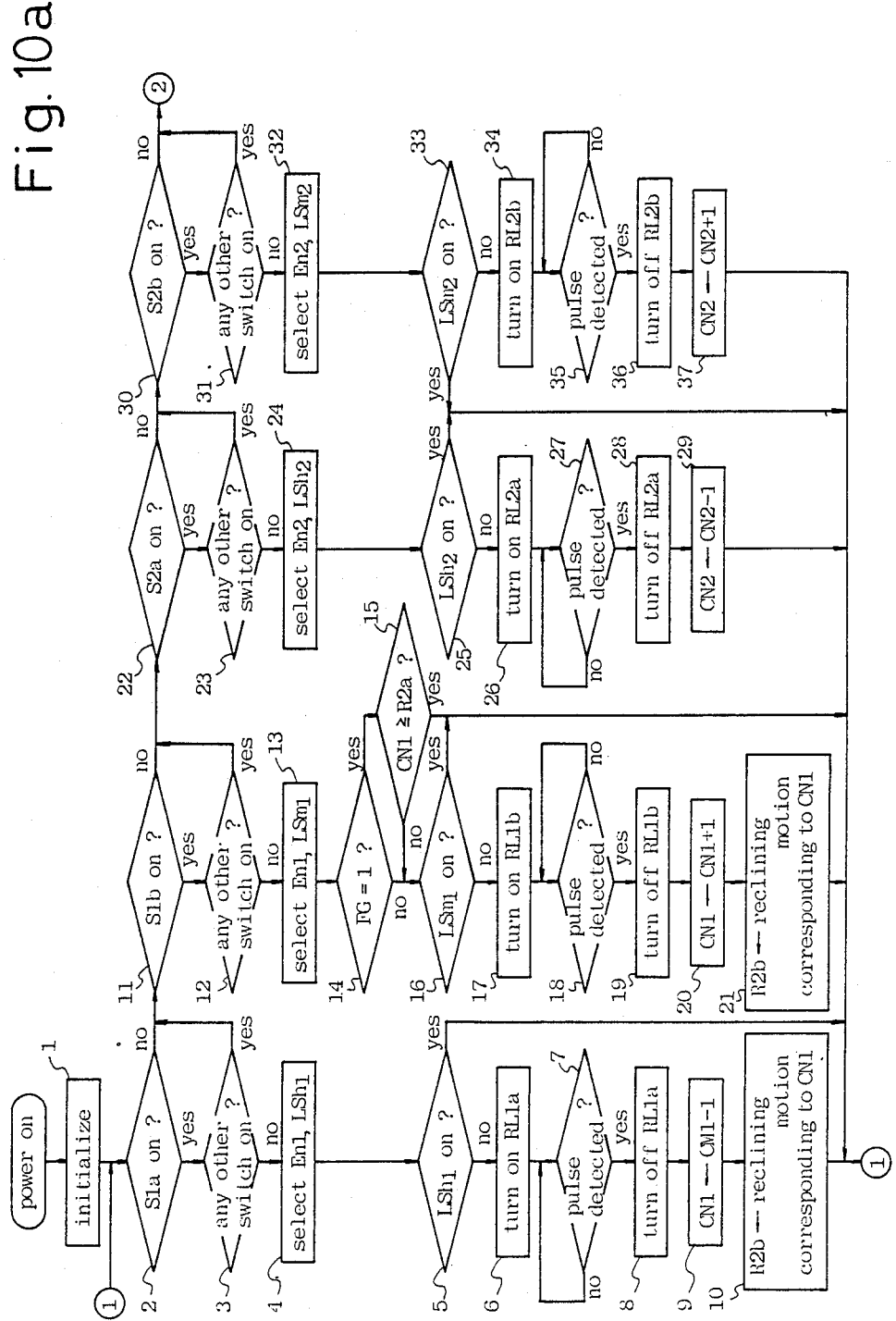

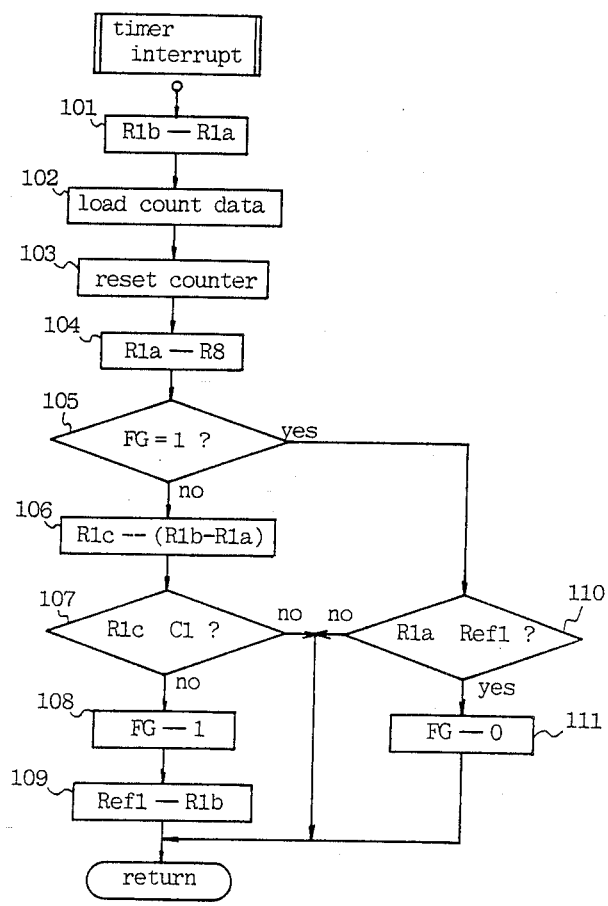

ATTITUDE CONTROL APPARATUS FOR ONBOARD SEAT

BACKGROUND OF THE INVENTION

The invention relates to an attitude control for an onboard seat, in particular, to the attitude control of a front seat of a vehicle which is provided with two or more rows of seats spaced in the fore-and-aft direction.

In many vehicles, a driver's seat is designed to permit a free change of its attitude so that a driver can choose an appropriate driving position. Often, a passenger seat which is located alongside the driver's seat is also designed to assume an adjustable attitude.

In certain mechanisms which support a seat, there is provided an electrical drive mechanism which allows the attitude of the seat to be changed by a switch operation. This facilitates changing the seat attitude without requiring an occupant to move his body through any significant stroke, thus allowing a selection of a seating attitude in a safe manner during driving a vehicle.

However, in a vehicle which is provided with a passenger seat located rearwardly of the driver, any attempt to change the attitude of a front seat may cause an oppression upon or a stressed attitude of a passenger who is seated upon a rear seat. Accordingly, if the driver desires to change the attitude of his seat, he must be careful by asking a passenger on the rear seat if it is permissible. However, it is a frequent occurrence that the driver changes the attitude of his seat to the unpreparedness of the rear passenger, causing a discomfort to the latter. The easier the attitude of the seat can be changed, the more frequently the discomfort is caused. There has been no accommodation for this in conventional arrangements, which is undesirable.

It is an object of the invention to provide an attitude control apparatus of onboard seat for use in a vehicle which is provided with two or more rows of the seats in the fore-and-aft direction, which avoids any discomfort caused to a passenger on a rear seat.

SUMMARY OF THE INVENTION

The above object is accomplished in accordance with the invention by an attitude control apparatus for onboard seat for use in a vehicle including a first onboard seat, a second onboard seat disposed rearwardly of the first onboard seat and input means for commanding a change in the attitude of the first onboard seat; comprising personnel detecting means for detecting the presence or absence of a personnel on the second onboard seat, and attitude control means responsive to an attitude control command from the input means for controlling drive means associated with an attitude changing mechanism on the basis of the presence or absence of a personnel detected by the personnel detecting means and attitude information detected by attitude detecting means.

With this arrangement, when there is a command which requires a change in the attitude of the first onboard seat, the attitude of the first onboard seat is controlled on the basis of the presence or absence of a personnel on the second onboard seat which is disposed rearward of the first onboard seat and of the detected attitude of the first onboard seat. In this manner, the presence or absence of a personnel on the second onboard seat is accommodated for in the attitude control.

In a preferred embodiment of the invention, an attitude changing mechanism comprises a fore-and-aft drive mechanism which changes a position of the first onboard seat as viewed in the fore-and-aft direction, and a tilt drive mechanism which changes a tilting of a seat back of the first onboard seat as viewed in the fore-and-aft direction.

The attitude control means includes memory means which stores a rear limit of the first onboard seat and a posterior tilt limit of the seat back. In response to a forward drive command which requires that the attitude of the first onboard seat be displaced to the front side, drive means assocated with the fore-and-aft drive mechanism is energized for forward drive to displace the first onboard seat forwardly. When there is a command which requires the first onboard seat to be displaced rearwardly, the drive means associated with the fore-and-aft drive mechanism is energized for rear drive to displace the first onboard seat rearwardly in the absence of a personnel on the second onboard seat. In response to a command which requires a rearward drive and in the presence of a personnel on the second onboard seat, the drive means associated with the fore-and-aft drive mechanism is energized for rearward drive to displace the first onboard seat rearwardly unless the first onboard seat has exceeded the rear limit. When there is a command which requires the seat back of the first onboard seat to be tilted in the anterior direction, drive means associated with the tilt drive mechanism is energized for anterior tilting drive to tilt the seat back in the anterior direction. In response to a command which requires the seat back of the first onboard seat to be tilted in the posterior direction and in the absence of a personnel on the second onboard seat, the drive means associated with the tilt drive mechanism is energized for posterior tilting drive to tilt the seat back in the posterior direction. In response to a command which requires the seat back of the first onboard seat to be tilted in the posterior direction and in the presence of a personnel on the second onboard seat, the drive means associated with the tilt drive mechanism is energized for posterior tilting drive to tilt the seat back in the posterior direction unless the tilting position of the seat back has exceeded the posterior tilt limit.

It will be noted that the fore-and-aft position of the first onboard seat and the tilt position of the seat back are closely related to each other with respect to a personnel containing space over the second onboard seat. Accordingly, the memory means stores a plurality of rear limits for the first onboard seat and a plurality of posterior tilt limits for the seat back in a co-related manner. The attitude control means reads a posterior tilt limit which corresponds to a particular fore-and-aft position detected to establish a particular posterior rear limit, or reads a particular rear limit which corresponds to a tilt position detected to establish a particular rear limit.

Thus, in the preferred embodiment, whenever a personnel is seated upon the second onboard seat, the first onboard seat is prevented from being driven rearwardly beyond the rear limit, and the seat back of the first onboard seat is prevented from being tilted in the posterior direction beyond the posterior tilt limit. Hence, if a driver commands a change in the attitude of the first onboard seat to the unpreparedness of a personnel on the second onboard seat, there is no oppression upon or there is caused no stressed attitude of the personnel on the second onboard seat, thus providing an attitude control apparatus for onboard seat which avoids any discomfort caused to a passenger.

Other objects and features of the invention will become apparent from the following description of an embodiment thereof.

BRIEF DESCRIPTION OF THE DRAWINGS

FIGS. 10a, 10b and 11 are flowcharts illustrating the general operation of the microcomputer 1 shown in FIG. 3.

EMBODIMENT

Figure 1:
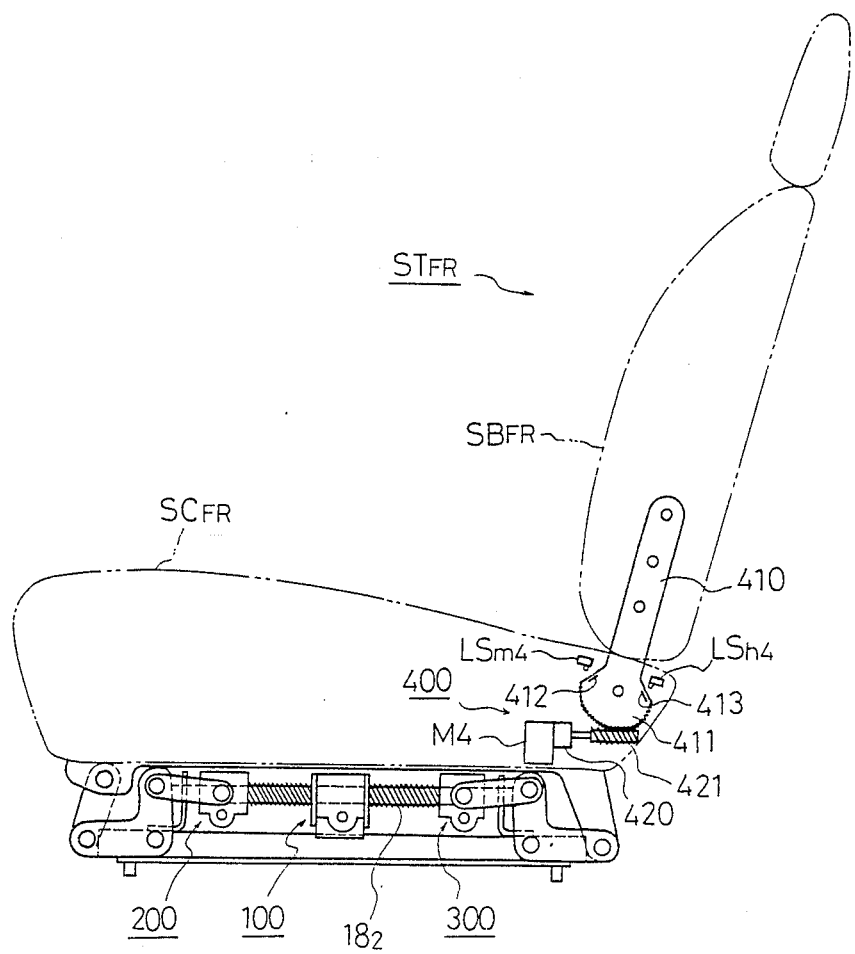
FIG. 1 is a side elevation schematically illustrating the mechanism of an apparatus according to one embodiment of the invention.

FIG. 1 schematically illustrates an attitude controlling mechanism for a driver's seat $ST_{FR}$ (hereafter also referred to as FR seat, standing for a front, right-hand seat, the same denotation also appearing as a suffix) of a vehicle constructed in accordance with one embodiment of the invention. Specifically, an attitude control mechanism for the seat $ST_{FR}$ comprises a sliding mechanism 100 which drives the seat $ST_{FR}$ fore and aft relative to the floor of the vehicle (shown at Flor in FIG. 5), front elevation adjusting mechanism 200 which drives the front end of a seat cushion $SC_{FR}$ of the seat $ST_{FR}$ up and down, a rear elevation adjusting mechanism 300 which drives the rear end of the seat cushion $SC_{FR}$ up and down, and a reclining mechanism 400 which adjusts the tilting of a seat back $SB_{FR}$ of the seat $ST_{FR}$.

Figure 2:
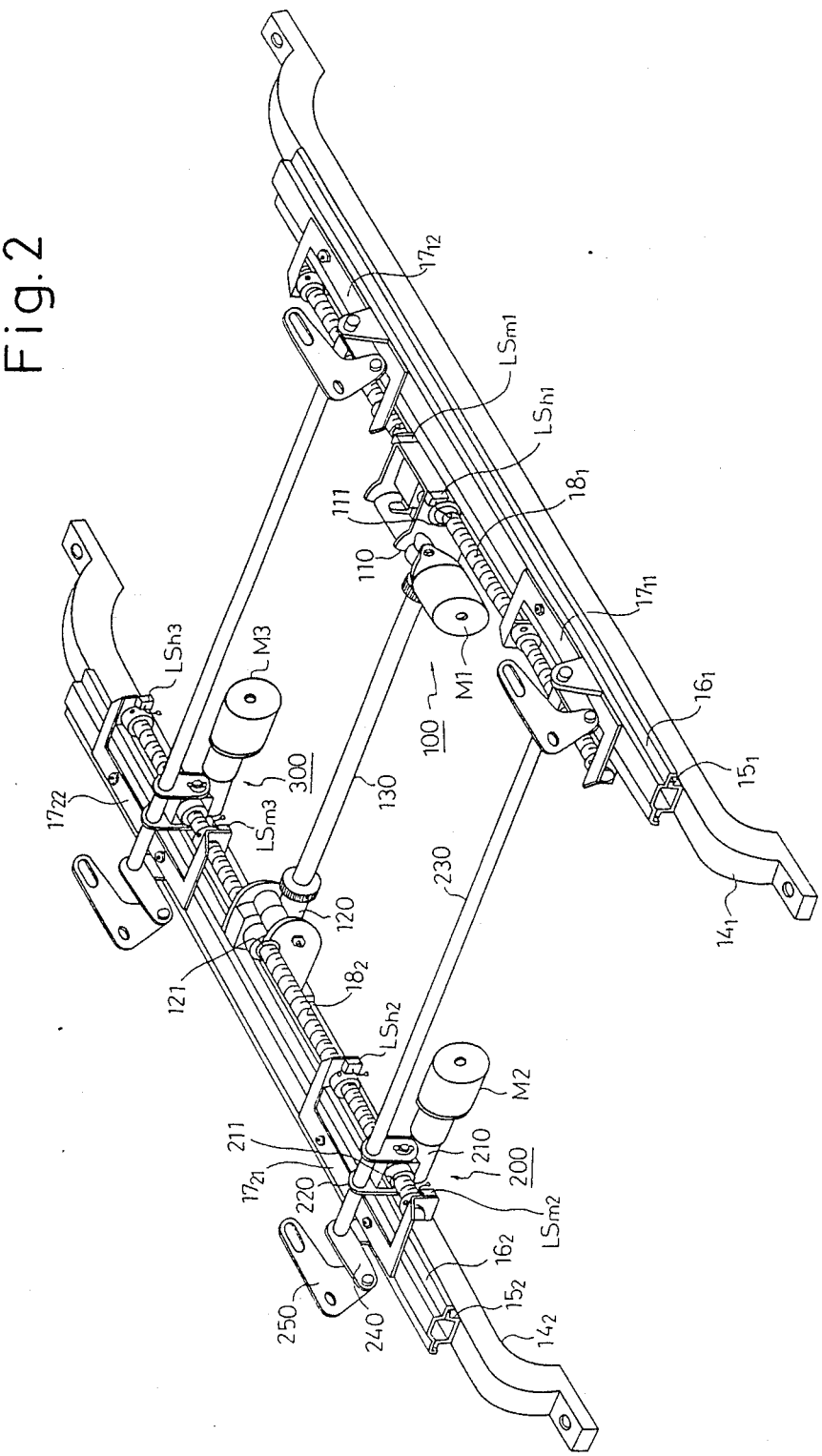
FIG. 2 is a perspective view of a seat base mechanism.

The seat $ST_{FR}$ is supported by a seat base mechanism shown in FIG. 2. Specifically, a pair of base frames $14_1$, $14_2$ are secured to the floor of the vehicle. A lower rail $15_1$ is secured to the base frame $14_1$ while a lower rail $15_2$ is secured to the base frame $14_2$. An upper rail $16_1$ slidably engages the lower rail $15_1$ while an upper rail $16_2$ slidably engages the lower rail $15_2$. A pair of arms $17_{11}$ and $17_{12}$ are fixedly mounted on the upper rail $16_1$ while a pair of arms $17_{21}$ and $17_{22}$ are fixedly mounted on the upper rail $16_2$. The arms $17_{11}$ and $17_{12}$ fixedly carries a threaded rod $18_1$ while the arms $17_{21}$ and $17_{22}$ fixedly carries a threaded rod $18_2$. The threaded rod $18_1$ is threadably engaged by a nut unit 110 which is secured to the base frame $14_1$ while the threaded rod $18_2$ is threadably engaged by a nut unit 120 secured to the base frame $14_2$.

The sliding mechanism essentially comprises the threaded rods $18_1$ and $18_2$, the nut units 110 and 120 and a motor M1. The nut unit 110 comprises a nut 111 formed with female threads which are engaged with the threaded rod $18_1$, and a worm gear which threadably engages the nut 111. Similarly, the nut unit 120 comprises a nut 121 formed with female threads which are threadably engaged with the threaded rod $18_2$ and a worm gear threadably engaged with the nut 121. The worm gear of the nut unit 110 and the worm gear of the nut unit 120 are connected together by a flexible shaft 130. In the nut unit 110, a bevel gear is fixedly mounted on the shaft of the worm gear and is in meshing engagement with a bevel gear which is fixedly mounted on the output shaft of the motor M1. Since the nut units 110 and 120 are secured to the base frames $14_1$ and $14_2$, respectively, it will be seen that the energization of the motor M1 for rotation causes a rotation of the worm gear of the nut unit 110 and also the worm gear of the nut unit 120 which is coupled thereto through the flexible shaft 130, thus rotating their meshing nuts 111 and 121. The nut 111 defines a screw pair with the threaded rod $18_1$ while the nut 121 defines a screw pair with the threaded rod $18_2$. Accordingly, the rotation of the nuts 111 and 121 is effective to feed the threaded rod $18_1$ or threaded rod $18_2$. Since the threaded rod $18_1$ is secured to the upper rail $16_1$ through the arms $17_{11}$ and $17_{12}$ while the threaded rod $18_2$ is secured to the upper rail $16_2$ through the arms $17_{21}$ and $17_{22}$, the movement of the threaded rods $18_1$ and $18_2$ is effective to cause the upper rails $16_1$ and $16_2$ to move along the lower rails $15_1$ and $15_2$, respectively. Thus, the energization of the motor M1 for rotation in either the forward or reverse direction causes the upper rails $16_1$ and $16_2$ to move along the lower rails $15_1$ and $15_2$, respectively, in the fore-and-aft direction. In the present embodiment, the rotation of the motor M1 in the forward direction causes the upper rails to move rearwardly or to the upper, right-hand corner as viewed in FIG. 2, while the rotation of the motor M1 in the reverse direction causes the upper rails to move forwardly or toward the lower, left-hand corner as viewed in FIG. 2. When the upper rail $16_1$ or $16_2$ is driven to its front limit position, a limit switch LSh1 mounted on the nut unit 110 bears against the arm $17_{11}$ to be turned on. When the upper rail is driven to its rear limit position, a similar limit switch LSm1 bears against the arm $17_{12}$ to be turned on.

The front elevation adjusting mechanism 200 comprises a motor M2, a nut unit 210 which is constructed in the identical manner as the nut unit 120 mentioned above, a rockable arm 220 rockably engaged with the unit unit 210, a rod 230 integrally secured to the rockable arm 220, a link arm 240 secured to the rod 230, and a base arm 250 pivotally mounted on the link arm 240. A seat cushion frame, not shown, of the seat $ST_{FR}$ is fixedly mounted on the base arm 250. By energizing the motor M2 for rotation in either forward or reverse direction, the nut unit 210 may be driven fore and aft along the threaded rod $18_2$, whereby the rockable arm 220, the rod 230 and the link arm 240 move angularly as a unit, thus moving the base arm 250 up and down. In the present embodiment, the rotation of the motor M2 in the forward direction causes an upward movement of the base arm 250 while the rotation of the motor M2 in the reverse direction causes a downward movement of the base arm 250. When the base arm 250 is driven to its upper limit position, a limit switch LSm2 bears against the nut unit 210 to be turned on. When the base arm 250 is driven to its lower limit position, a similar limit switch LSh2 is turned on.

The construction and operation of the rear elevation adjusting mechanism 300 is essentially the same as those of the front elevation adjusting mechanism 200 and therefore will not be described.

Returning to FIG. 1, a reclining arm 410 has its one end secured to a seat back frame, not shown, of the seat $ST_{FR}$ and its other end is pivotally connected to a seat cushion frame, not shown, of the same seat. Its end pivotally connected to the seat cushion frame is formed with a sector gear 411, which forms a worm gear together with a screw gear 421 which is coupled to an output shaft of a motor M4 through a gear box 420. In this manner, the reclining mechanism 400 is formed by the combination of the motor M4, the gear box 420, the worm gear comprising the screw gear 421 and the sector gear 411, and the reclining arm 410. When the motor M4 is energized for rotation, the reclining arm 410 is angularly driven about its pivot through the worm gear, thus tilting the seat back $SB_{FR}$ either in the anterior or posterior direction.

In the present embodiment, when the motor M4 rotates in the forward direction, the seat back $SB_{FR}$ is tilted in the posterior direction while when the motor M4 rotates in the reverse direction, the seat back $SB_{FR}$ is tilted in the anterior direction. When the seat back $SB_{FR}$ is driven to its posterior tilt limit, a limit switch LSm4 fixedly mounted on the seat cushion frame bears against a projection 413 on the sector gear 411 to be turned on. When the seat back $SB_{FR}$ is driven to its anterior tilt limit, a limit switch LSh4 fixedly mounted on the seat cushion frame bears against a projection 412 on the sector gear 411 to be turned on.

Figure 3:
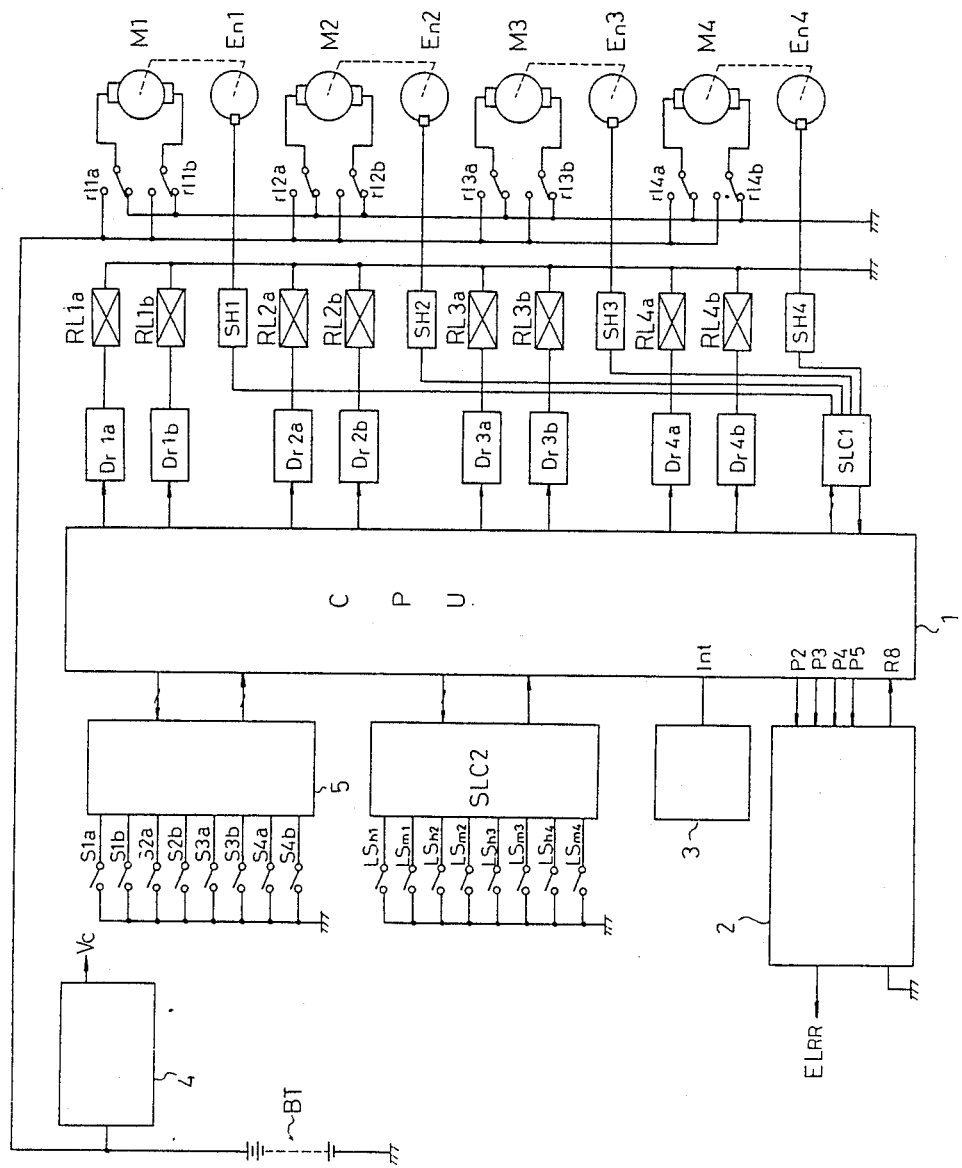
FIG. 3 is a block diagram of a control system used in the apparatus of the embodiment.

FIG. 3 is a block diagram of a control system which drives and controls the apparatus of the present embodiment. The control system essentially comprises a microcomputer 1 (which will be hereafter referred to as CPU). Connected to CPU 1 are an occupant detector unit 2, 0.1 second timer 3, a switch encoder 5, a plurality of relay drivers Dr1a, Dr1b, Dr2a, Dr2b, Dr3a, Dr3b, Dr4a and Dr4b, and selectors SLC1 and SLC2. A power supply circuit 4 feeds a constant voltage Vc to various parts. A relay driver Dr1a energizes and deenergizes a relay RL1a. Similarly, relay drivers Dr1b, Dr2a, Dr2b, Dr3a, Dr3b, Dr4a and Dr4b are associated with relays RL1b, RL2a, RL2b, RL3a, RL3b, RL4a and RL4b, respectively, for energization and deenergization thereof. The relay RL1a has a relay contact rl1a and the relay RL1b has a relay contact rl1b, which are connected in circuit with the motor M1. Whe the relay RL1a is energized to cause the relay contact rl1a to make with the power supply, the motor M1 is energized for rotation in the reverse direction. When the relay RL1b is energized to cause the relay contact rl1b to actuate the power supply, the motor is energized for rotation in the forward direction. Similarly, the motor M2 is energized for rotation in the reverse direction and in the forward direction when the relays RL2a and RL2b are energized, respectively; the motor M3 is energized for rotation in the reverse direction and in the forward direction when the relays RL3a and RL3b are energized, respectively; the motor M4 is energized for rotation in the reverse direction and in the forward direction when the relays RL4a and RL4b are energized, respectively.

The output shaft of the motor M1 carries a rotary encoder En1. Similarly, the output shaft of each of motors M2, M3 and M4 carries a rotary encoder En2, En3 or En4, respectively. An output pulse from the encoder En1 is passed through a waveform shaper SH1 to feed the selector SLC1. Similarly, output pulses from the encoders En2, En3 and En4 are passed through the waveform shapers SH2, SH3 and SH4, respectively, to feed the selector SLC1. The selector SLC1 selects one of these signals to feed it to CPU 1 in response to a command from CPU 1.

A switch encoder 5 is connected to a forward slide switch S1a, a rear slide switch S1b, a seat front declining switch S2a,, a seat front elevating switch S2b, a seat rear declining switch S3a, a seat rear elevating switch S3b, an unreclining switch S4a and a reclining switch S4b. In response to a command from CPU 1, the switch encoder 5 reads the status of these switches to feed information to the processor CPU 1.

The selector SLC2 is connected to the limit switches LSh1, LSm1, LSh2, LSm2, LSh3, LSm3, LSh4 and LSm4, described above, to select one of these switches to feed information to CPU 1 in response to a command therefrom.

0.1 second timer 3 generates an interrupt request fed to CPU 1 every 0.1 second. During an interrupt operation which is initiated by the interrupt request from the timer 3, CPU 1 detects the presence or absence of an occupant on a seat located directly behind the driver (such seat will hereafter be referred to as RR seat) using the occupant detector unit 2 to be described later.

Figure 4:
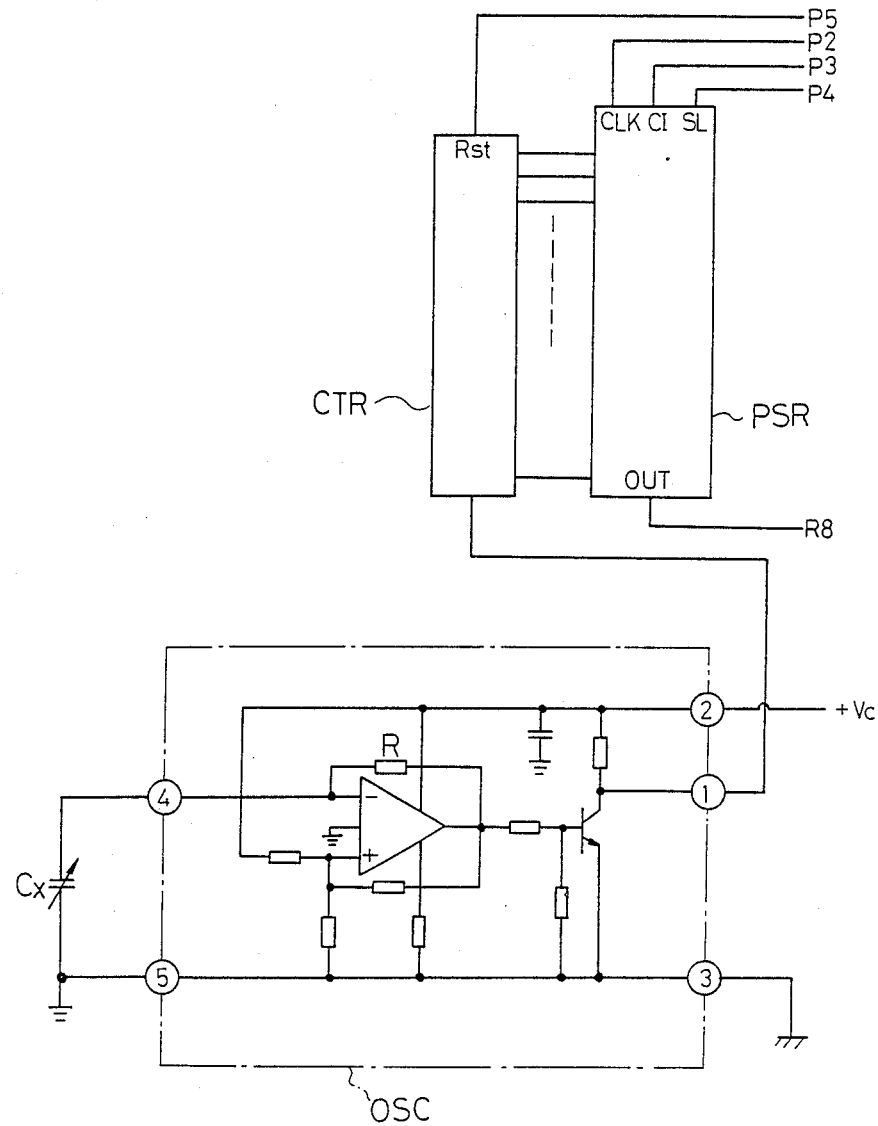
FIG. 4 is a block diagram of an occupant detector unit 2 used in the system of FIG. 3.

FIG. 4 shows the occupant detector unit 2. The unit 2 comprises an oscillator OSC, a counter CTR, and a parallel-in and serial-out shift register (hereafter abbreviated as PS register) PSR.

The oscillator OSC comprises an astable multivibrator with an external capacitor Cx connected between terminals 4 and 5. In FIG. 4, resistors are indicated by rectangles. By choosing suitable values for the resistors, there can be obtained an output signal of a frequency which is inversely proportional to the product of the capacitance of the external capacitor Cx and the resistance of resistor R, the frequency decreasing for an increased capacitance and increasing for a decreased capacitance of the external capacitor Cx.

The output signal from the terminal 1 of the oscillator OSC is applied to an input terminal IN of the counter CTR, which counts up in response to the leading end of the output signal. The counter CTR have 16 bit parallel output terminals which are connected to 16 bit parallel input terminals of the PS register PSR. The counter CTR has a reset input terminal Rst, which is connected to an output port P5 of CPU 1.

The register PSR has a clock input terminal CLK connected to an output port P2 of CPU 1, a clock inhibit input terminal CI connected to an output port P3 of CPU 1, and a shift load input terminal SL connected to an output port P4 of CPU 1. The register PSR presets 16 bit data applied to its parallel input terminals into the respective bit position in response to the leading end of a shift load pulse fed from CPU 1, and serially delivers the preset data from its output terminal OUT to a serial input port R8 of CPU 1 in synchronism with the clock pulse applied to its clock input terminal CLK in response to a change in the clock inhibit signal applied to the clock inhibit input terminal CI from CPU 1 to its low level (L).

Figure 5:
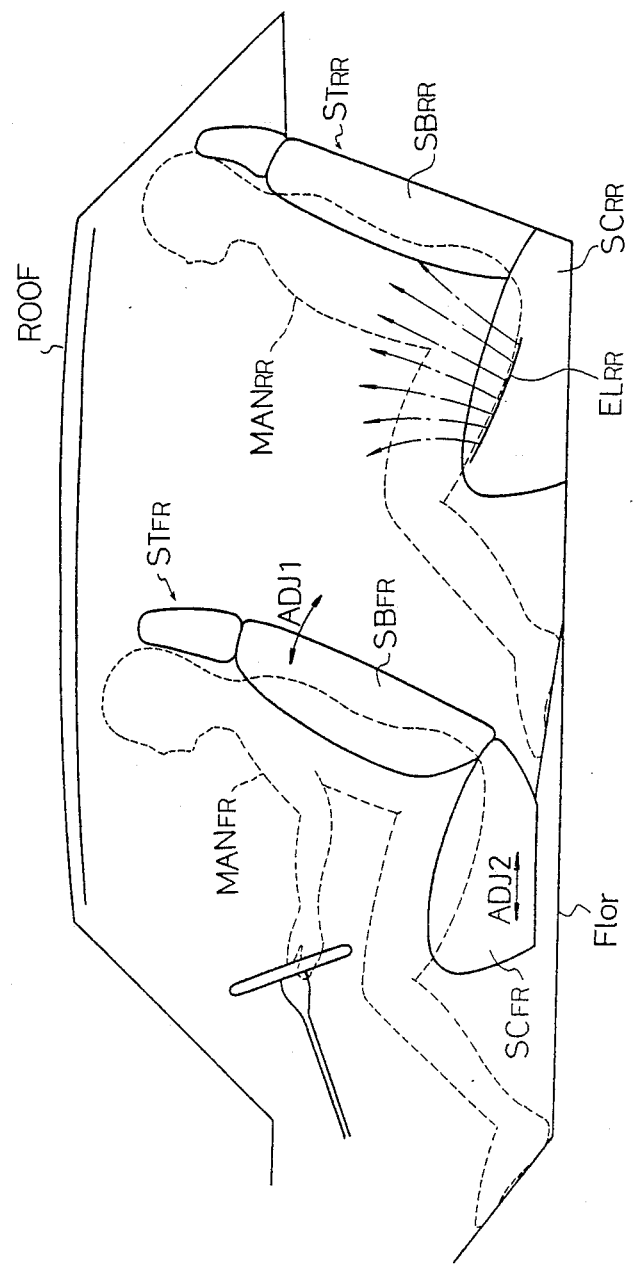
FIG. 5 is a side elevation of a vehicle, illustrating the disposition of a detecting electrode $EL_{RR}$.

The capacitor Cx shown in FIG. 4 comprises an occupant detecting capacitor defined between a detecting electrode $EL_{RR}$ which is mounted on the seat cushion $SC_{RR}$ of the seat $ST_{RR}$ and the electrical ground defined by the body such as a roof ROOF or a floor Flor, as shown in FIG. 5. Thus, the detecting electrode $EL_{RR}$ is connected to the terminal 4 and the electrical ground is connected to the terminal 5 of the oscillator OSC.

Figure 6:
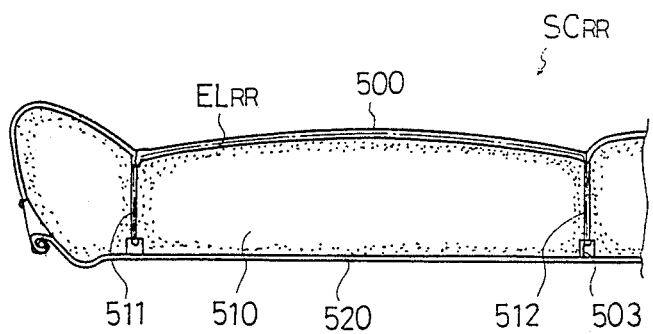
FIG. 6 is a fragmentary section of a seat cushion $SC_{RR}$ in which the detecting electrode $EL_{RR}$ is assembled.

FIG. 6 is a cross section of the seat cushion $SC_{RR}$ of the RR seat on which an occupant $MAN_{RR}$ is seated. The seat cushion $SC_{RR}$ comprises a pad support 520 formed of a resin on which a urethane seat cushion pad 510 covered with a trim cover assembly 500 is disposed. Where necessary, the trim cover assembly 500 is fastened to the underside of the seat cushion pad 510 by tension cords extending through holes 511 and 512 formed so as to extend through the seat cushion pad 510, and its opposite ends are fastened to the pad support 520 for retention. The detecting electrode $EL_{RR}$ is assembled into the trim cover assembly 500 and has a lead wire 503 which is passed through the hole 512 to the underside of the seat cushion pad 510 so as to be connected to the terminal 4 of the oscillator OSC which is mounted on the pad support 520 (not shown).

Figure 7:
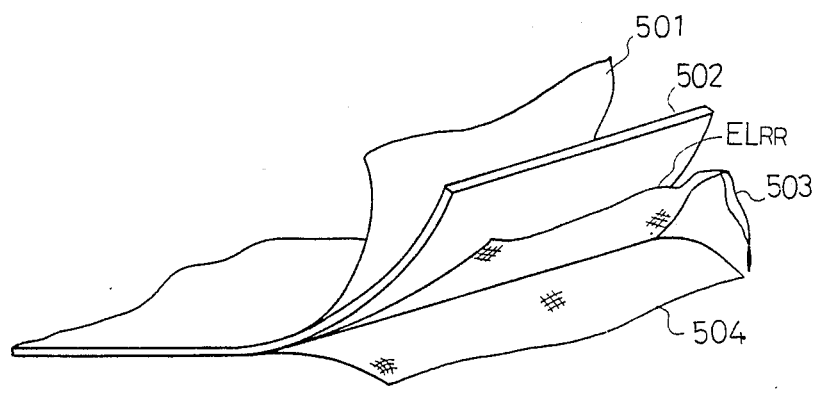
FIG. 7 is a perspective view showing a trim assembly 500 shown in FIG. 6 in detail.

FIG. 7 shows the detail of the trim cover assembly 500 in a region where the detecting electrode $EL_{RR}$ is assembled. Specifically, it comprises a skin 501, a wadding 502 which serves producing the thickness effect of the trim cover assembly and formed by a sheet of sponge material, and a wadding cover 504. The detecting electrode $EL_{RR}$ is formed by a conductive woven fabric which is subjected to an electroless nickel plating, and is interposed between the wadding 502 and the wadding cover 504 to be stitched as the trim cover assembly 500 is sewn. The electrode has a size which depends on an area, the detection of which is desired, but in the present embodiment, it is sized as about 30 cm square, with its corner formed into a ribbon to define the lead wire 503. Thus it will be seen that the detecting electrode $EL_{RR}$ can be assembled into the trim cover assembly 500 without requiring any additional processing step. Because it conforms to other components of the trim cover assembly, the area of the assembly 500 in which the detecting electrode $EL_{RR}$ is assembled can be treated in the same manner as the remainder. In other words, the detecting electrode $EL_{RR}$ has no adverse influence upon the workability, the appearance or seating reaction.

It will be noted that the skin 501, the wadding 502 and the wadding cover 503 which form the trim cover assembly as well as the seat cushion pad 510 and the pad support 520 are all formed by insulators, and thus the detecting electrode $EL_{RR}$ is insulated from the electrical ground to form an occupant detecting capacitor with the electrical ground. Arrows shown in phantom lines in FIG. 5 represent electric lines of force which would be produced when a suitable voltage is applied to the occupant detecting capacitor. Since the occupant $MAN_{RR}$ seated upon the seat $ST_{RR}$ links with these electric lines of force, such occupant may be considered as a high dielectric member interposed between the electrodes of the occupant detecting capacitor. In other words, the occupant detecting capacitor has a capacitance which varies largely between the presence and the absence of the occupant $MAN_{RR}$.

Figure 8:
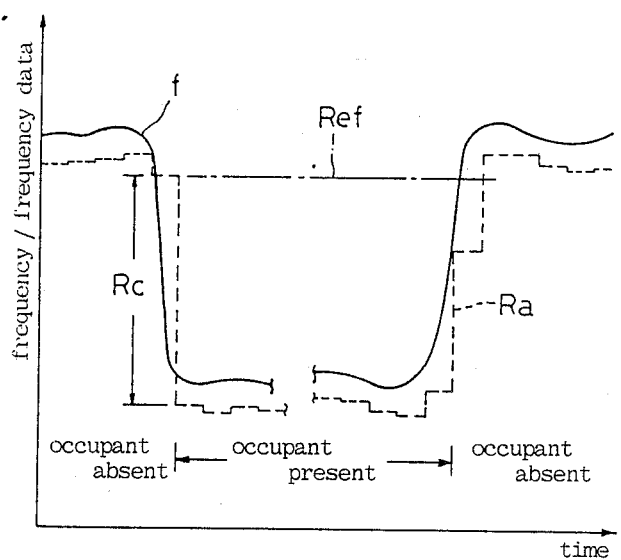
FIG. 8 graphically shows the oscillation frequency a of an oscillator OSC shown in FIG. 4 and reference data Ref established by a microcomputer 1 shown in FIG. 3 as a function of time.

Referring to FIG. 8, the detection of the presence of an occupant with the apparatus of the embodiment will be described briefly. FIG. 8 graphically shows an example of a change in the oscillation frequency f of the oscillator OSC with time by a solid line curve, frequency data Ra which is sampled by CPU 1 by a broken line curve and reference data Ref established by CPU 1 by a phantom line curve, respectively.

CPU 1 samples the number of pulses which are output from the oscillator during the interrupt period of 0.1 second timer 3 or during a time interval of 0.1 second, and which corresponds to the oscillation frequency f of the oscillator, thereby monitoring a change in the oscillation frequency f. Specifically, frequency data Ra obtained during a current sampling is compared against old frequency data which is obtained during the immediately preceding sampling to derive change data Rc. While the oscillation frequency f of the oscillator OSC is continually changing though slightly, there occurs a rapid reduction in a frequency to cause the change data Rc to exceed a given value when the occupant $MAN_{RR}$ is seated upon the seat $ST_{RR}$. Upon detection of this change, the presence of an occupant is determined, and the frequency data which was obtained before the occurrence of the reduction or obtained during the previous sampling is chosen as a reference data Ref. Subsequently, the frequency data Ra is examined, and the absence of an occupant is determined if it exceeds reference data Ref.

Figure 9:
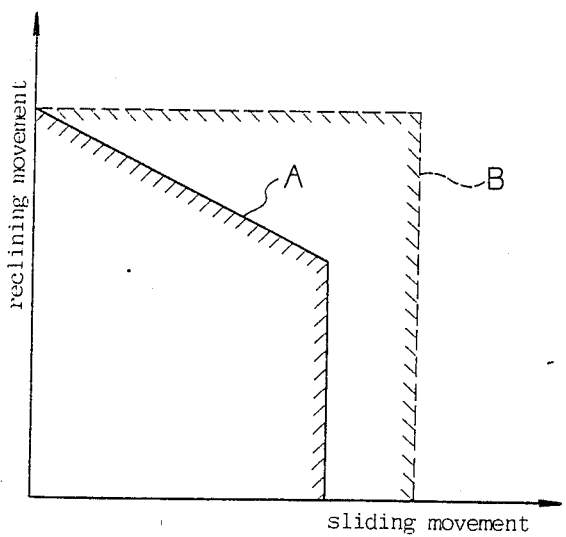
FIG. 9 graphically illustrates an available range of the attitude of a driver's seat which varies depending on the presence or absence of a personnel on a rear seat.

Returning to FIG. 5, when the occupant $MAN_{RR}$ is seated upon the seat $ST_{RR}$, CPU 1 limits the amount of adjustment (sliding movement) of the seat $ST_{FR}$ which occurs in a direction indicated by an arrow ADJ2 depending on the operation of the switches S1a and S1b and also limits the amount of the adjustment (reclining movement) of the seat back $SB_{FR}$ which occurs in a direction indicated by an arrow ADJ1 depending on the operation of the switches S4a and S4b. This manner of limitation is graphically shown in FIG. 9 where the abscissa represents the amount of sliding movement which is referenced to the front limit position while the ordinate represents the amount of reclining movement which is referenced to the forwardly declining limit position. A region A indicated in FIG. 9 illustrates the extent to which the sliding movement and the reclining movement can change when the occupant $MAN_{RR}$ is seated upon the seat $ST_{RR}$ while a region B indicates the extent to which the sliding movement and the reclining movement can change in the absence of the occupant $MAN_{RR}$ on the seat $ST_{RR}$. Specifically, when the occupant $MAN_{RR}$ is not seated upon the seat $ST_{RR}$, both the sliding movement and the reclining movement can be changed freely between the front and the rear limit, but when the occupant $MAN_{RR}$ is present on the seat $ST_{RR}$, the reclining movement is limited as the sliding movement increases or conversely the sliding movement is limited as the reclining movement increases. This would be explained by the experience that if the seat $ST_{FR}$ is located forwardly, the seat back $SB_{FR}$ may be reclined to an increased degree while securing the space for an occupant sitting on the seat $ST_{RR}$ while if the seat back $SB_{FR}$ assumes a more raised position, the seat $ST_{FR}$ may be retracted to a certain degree while securing the space for an occupant on the seat $ST_{RR}$. On the other hand, when the seat $ST_{FR}$ is retracted, the seat when an occupant on the seat $ST_{RR}$ cannot be secured if the seat back $SB_{FR}$ is brought to its raised position, and if the seat back $SB_{FR}$ is reclined, the space for an occupant on the seat $ST_{RR}$ cannot be secured unless the seat $ST_{FR}$ is located at a relatively advanced position. In the present embodiment, a graph corresponding to the region A is formed on the basis of an actual measurement, and is stored in an internal ROM of CPU 1 in a table form.

The operation of CPU 1 will now be specifically described with reference to flowcharts shown in FIGS. 10a, 10b and 11. When an electrical storage battery onboard a vehicle is connected to the circuit of the invention to feed various parts, CPU 1 initializes the apparatus by resetting various output ports and components at step 1 (the step number being entered in the flowcharts shown in the drawings), thus setting up the seat $ST_{FR}$ in its standard attitude. Specifically, the seat $ST_{FR}$ is driven forward by energizing the motor M1 for rotation in the reverse direction until the limit switch LSh1 is turned on, and then the motor M1 is energized for rotation in the forward direction to set it at a standard slide position while counting the number of pulses from the encoder En1 by means of a counter CN1. The motor M2 is then energized for rotation in the reverse direction to reduce the elevation of the front portion of the seat cushion $SC_{FR}$ until the limit switch LSh2 is turned on, whereupon the motor M2 is energized for rotation in the forward direction to set up a standard elevation while counting the number of pulses from the encoder En2 by means of a counter CN2. The motor M3 is then energized for rotation in the reverse direction to reduce the elevation of the rear portion of the seat cushion $SC_{FR}$ until the limit switch LSh3 is turned on, whereupon the motor M3 is energized for rotation in the forward direction to set up a standard elevation while counting the number of pulses from the encoder En3 by means of a counter CN3. The motor M4 is then energized for rotation in the reverse direction to tilt the seat back $SB_{FR}$ forwardly until the limit switch LSh4 is turned on, whereupon the motor M4 is energized for rotation in the forward direction to set up a standard tilt angle while counting the number of pulses from the encoder En4 by means of a counter CN4.

When the seat $ST_{FR}$ is set up in its standard attitude, a timer interrupt by the 0.1 second timer 3 is enabled, and the program proceeds to step 2 and subsequent steps. Every time an interrupt request is generated by the timer 3, an interrupt processing operation shown in FIG. 11 is executed to detect the presence or absence of an occupant on the seat $ST_{RR}$. The interrupt processing operation will be described first with reference to FIG. 11.

In the interrupt processing operation, data in a register R1a is stored in register R1b at step 101. As will be apparent from the following description, this data represents the frequency data obtained during the immediately preceding interrupt operation or 0.1 second before. At step 102, a shift load pulse (SL pulse) is delivered to the shift load input terminal of PS register PSR, and count data in the counter CTR is preset therein. At step 103, a reset pulse is applied to the reset input terminal Rst of the counter CTR, thereby resetting it. In this manner, the counter CTR counts the number of pulses developed by the oscillator OSC during the interrupt period of the timer 3.

At step 104, the clock inhibit signal which is applied to the clock inhibit input terminal CI is changed to its low level (L), whereby preset data in the register PSR which is serially delivered from its output terminal OUT in synchronism with the clock pulse is read. In this manner, the input to the serial input port R8 is read and is stored in the register R1a as frequency data.

A flag FG indicates the presence or absence of an occupant on the seat $ST_{RR}$. It is initially assumed that the flag is reset to 0, indicating the absence of an occupant. At step 106, the content of register R1a is subtracted from the content of the register R1b to provide a change data, which is written into register R1c. At step 107, the content of the register R1c (change data) is compared against a threshold value C1 which is determined experimentarily. When no occupant is seated upon the seat $ST_{RR}$, the change data will have a small value and does not exceed the threshold C1. Accordingly the program directly returns to the main routine. However, when an occupant is seated, there occurs a rapid reduction in the oscillation frequency of the oscillator OSC as mentioned previously, whereby the change data exceeds the threshold C1. In this instance, the flag FG is set to "1" at step 108, and the content of the register R1b or the old frequency data is written into the register Ref1 as reference data at step 109.

When the flag FG is set, the content of the register Ref1 or the reference data is compared against the content of the register R1a or fresh frequency data during the subsequent interrupt processing operation. As mentioned, when an occupant is seated upon the seat $ST_{RR}$, any change in the oscillation frequency of the oscillator OSC is small, and hence the fresh frequency data stored in the register R1a cannot exceed reference data stored in the register Ref1. However, when the occupant who has been sitting on the seat $ST_{RR}$ gets out of the vehicle, there occurs a rapid increase in the oscillation frequency, whereby the fresh frequency data stored in the register R1a exceeds the reference data stored in the register Ref1. At this time, the flag FG is reset to "0" at step 111.

In this manner, during the interrupt processing operation, the presence or absence of an occupant is detected in terms of a change in the capacitance between the detecting electrode $EL_{RR}$ and the electrical ground, thus avoiding the likelihood of an erroneous detection due to the influences of the temperature, humidity or aging effect. It is to be understood that when a baggage or the like is placed upon the seat, a corresponding change in the capacitance differs largely from that which occurs when an occupant is seated, thus avoiding an erroneous detection which might be caused by a conventional seating switch (which is assembled into the seat cushion and is turned on when a weight is applied thereon).

Returning to FIG. 10a, an operation which begins with step 4 is executed upon detection of the operation of the forward slide switch S1a which is not concurrent with any other switch operation at steps 2 and 3. Thus, in the present embodiment, when a plurality of switches are operated simultaneously, an operation which corresponds to the initially operated switch takes place. At step 4, the selector SLC1 is commanded to select an output from the encoder En1 while the selector SLC2 is commanded to select an output from the limit switch LSh1. The limit switch LSh1 indicates the forward sliding limit position for the seat $ST_{FR}$. Hence, if this limit switch is turned on, it is impossible to drive the seat $ST_{FR}$ further forwardly. Accordingly, when the limit switch LSh1 is on, the program returns from step 5 to step 2, thus cancelling the switch operation.

When the limit switch LSh1 is off, one step energization of the motor M1 for rotation in the reverse direction takes place at steps 6 to 8. Specifically, the relay driver Dr1a is commanded to energize the relay RL1a for rotation in the reverse direction at step 6, and the output pulse from the encoder En1 is monitored at step 7, and when the output pulse is detected, the relay driver Dr1a is commanded to deenergize the relay RL1a and hence the motor M1 at step 8. As a consequence the seat $ST_{FR}$ is moved forward by an amount corresponding to one step, whereby the counter CN1 is decremented by one (the retracting direction is taken as the positive) at step 9, and at step 10, the reclining limit value (the reclining limit when the occupant is seated upon the seat $ST_{RR}$) which corresponds to the value of the counter CN1 or the sliding movement is read from ROM table which stores the graph corresponding to the region A shown in FIG. 9, and is stored in a register R2b. The described operation is repeated as long as the switch S1a remains on.

When an operation of the rear sliding switch S1b which is not concurrent with any other switch operation is detected at steps 11 and 12, the program enters the execution of step 13 and subsequent steps. At step 13, the selector SLC1 is commanded to select an output from the encoder En1 while the selector SLC2 is commanded to select an output from the limit switch LSm1. As mentioned previously, when the occupant is seated upon the seat $ST_{RR}$, the retracting drive of the seat $ST_{FR}$ is limited. In this instance, since the flag FG has been set to "1" during the interrupt processing operation, the program proceeds from step 14 to step 15 where the value in the counter CN1 is compared against a value in a register R2a. As will be described later, the register R2a stores a sliding limit (the retracting limit when the occupant is seated upon the seat $ST_{RR}$) which is read from the ROM table in a manner corresponding to the prevailing reclining movement. Thus, if the value in the counter CN1 is equal to or greater than the value in the register R2a, this means that there is the likelihood that a seating space for an occupant on the seat $ST_{RR}$ may not be secured, as by presenting an oppressio upon part of his physical body, if the seat $ST_{FR}$ is driven in a rearward direction. Accordingly, the program returns from step 15 to step 2, thus cancelling the prevailing switch operation.

When there is no occupant seated upon the seat $ST_{RR}$ and the flag FG is reset, or when an occupant is seated thereon, but the sliding position of the seat $ST_{FR}$ or the value in the counter CN1 is less than the sliding limit, the limit switch LSm1 is examined at step 16. The limit switch LSm1 represents the rear sliding limit for the seat $ST_{FR}$. Accordingly, if this switch is turned on, it is impossible to drive the seat $ST_{FR}$ further rearward. Accordingly, when the limit switch LSm1 is on, the program returns from step 16 to step 2, thus cancelling the prevailing switch operation.

When the limit switch LSm1 is off, one step energization of the motor M1 for rotation in the forward direction takes place at steps 17 to 19. Specifically, at step 17, the relay driver Dr1b is commanded to energize the relay RL1b for energizing the motor M1 for rotation in the forward direction, and at step 18, the output pulse from the encoder En1 is monitored. When the output pulse is detected, the relay driver Dr1b is commanded to deenergize the relay RL1b and hence the motor M1 at step 19. This produces one step movement of the seat $ST_{FR}$ in the rear direction, whereby the counter CN1 is incremented by one at step 20. At step 21, the reclining limit (the reclining limit when an occupant is seated upon the seat $ST_{RR}$) corresponding to the value in the counter CN1 or the sliding movement is read from the ROM table which represent the graph corresponding to the region A shown in FIG. 9, and is stored in a register R2b. The described operation is repeated as long as the switch S1b remains on.

When an operation of the seat front declining switch S2a, which is not concurrent with any other switch operation is detected at steps 22 and 23, the selector SLC1 is commanded to select an output from the encoder En2 and the selector SLC2 is commanded to select an output from the limit switch LSh2 at step 24.

At step 25, the limit switch LSh2 is examined. If the front of the seat cushion $SC_{FR}$ is located at its lower limit, the limit switch is turned on, and in this instance the operation of the switch S2a, is cancelled. However, if the limit switch is off, one step energization of the motor M2 for rotation in the reverse direction takes place while monitoring the output pulse from the encoder En2, at steps 26 to 28. This causes the front portion of the seat cushion $SC_{FR}$ to be declined by one step, whereby the counter CN2 is decremented by one (the elevating direction being taken as the positive) at step 29. Such operation is repeated as long as the switch S2a, remains on.

When an operation of the seat front elevating switch S2b, which is not concurrent with any other switch operation, is detected at steps 30 and 31, the selector SLC1 is commanded to select an output from the encoder En2 and the selector SLC2 is commanded to select an output from the limit switch LSm2 at step 32.

Subsequently, the limit switch LSm2 is examined at step 33. If the front portion of the seat cushion $SC_{FR}$ is located at its upper limit, this switch is turned on. In this instance, the operation of the switch S2b is cancelled. However, if the limit switch is off, one step energization of the motor M2 for rotation in the forward direction takes place while monitoring the output pulse from the encoder En2 at steps 34 to 36. This elevates the front portion of the seat cushion $SC_{FR}$ upwardly by one step, whereby the counter CN2 is incremented by one at step 37. This operation is repeated as long as the switch S2b remains on.

Figure 10B:
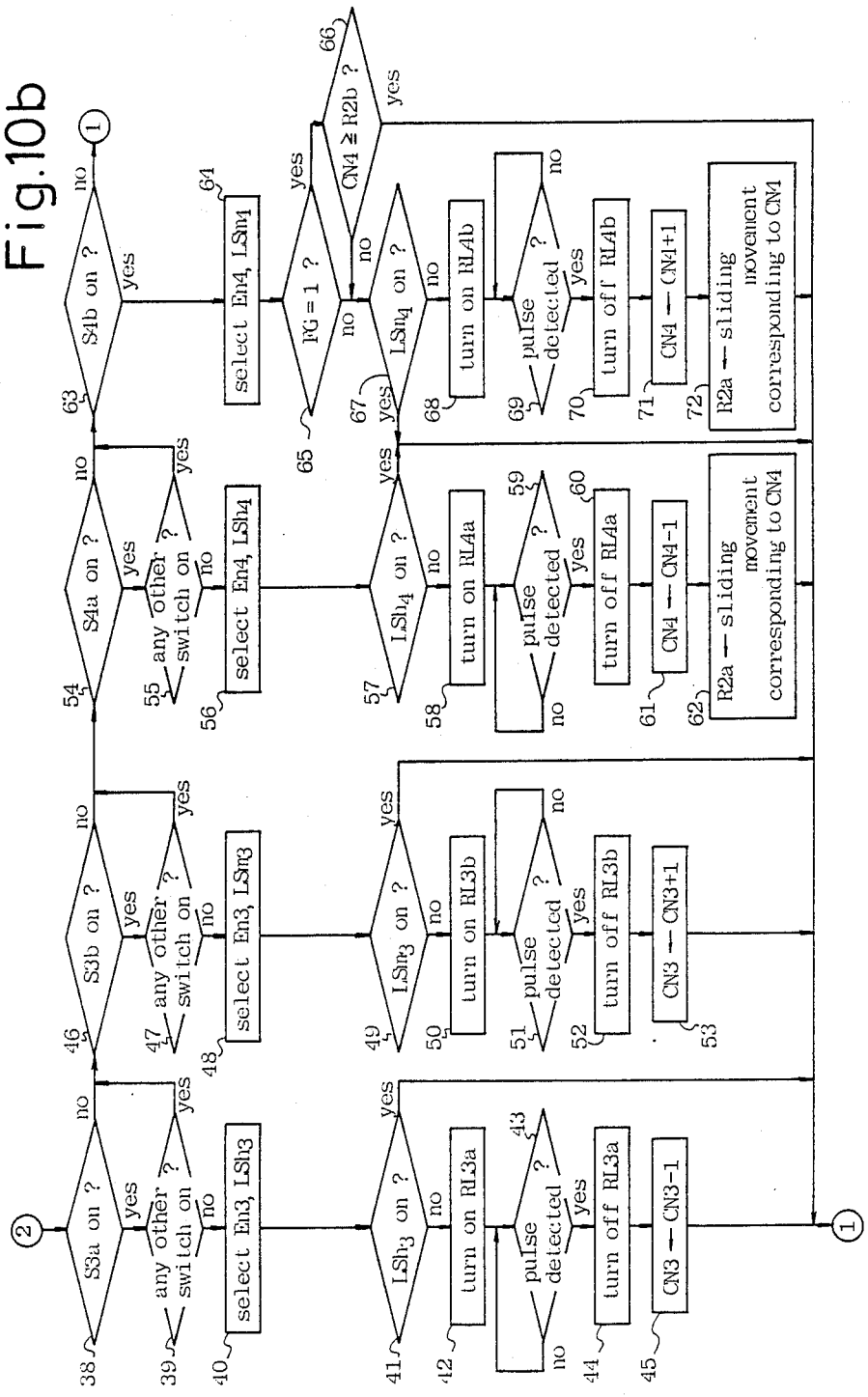

Referring to FIG. 10b, when an operation of the seat rear declining switch S3a which is not concurrent with any other switch operation is detected at steps 38 and 39, the selector SLC1 is commanded to select an output from the encoder En3 and the selector SLC2 is commanded to select an output from the limit switch LSh3 at step 40.

Subsequently, the limit switch LSh3 is examined at step 41. If the rear portion of the seat cushion $SC_{FR}$ is located at its lower limit, this switch is turned on. In this instance, the operation of the switch S3a is cancelled. However, if the limit switch is off, one step energization of the motor M3 for rotation in the reverse direction while monitoring the output pulse from the encoder En3 takes place at steps 42 to 44. This declines the rear portion of the seat cushion $SC_{FR}$ by one step, whereb the counter CN3 is decremented by one (the rising direction being taken as positive) at step 45. This operation is repeated as long as the switch S3a remains on.

When an operation of the seat rear elevating switch S3b which is not concurrent with any other switch operation is detected at steps 46 and 47, the selector SLC1 is commanded to select an output from the encoder En3 and the selector SLC2 is commanded to select an output from the limit switch LSh3 at step 48.

Subsequently, the limit switch LSh3 is examined at step 49. If the rear portion of the seat cushion $SC_{FR}$ is located at its upper limit, this switch is turned on. Accordingly, the operation of the switch S3b is cancelled.

However, if the limit switch is off, one step energization of the motor M3 for rotation in the forward direction takes place while monitoring the output pulse from the encoder En3 at steps 50 to 52. This causes the rear portion of the seat cushion $SC_{FR}$ to be elevated by one step, whereby the counter CN3 is incremented by one at step 53. This operation is repeated as long as the switch S3b remains on.

When an operation of unreclining switch S4a which is not concurrent with any other switch operation is detected at steps 54 and 55, the selector SLC1 is commanded to select an output from the encoder En4 and the selector SLC2 is commanded to select an output from the limit switch LSh4 at step 56.

Subsequently, the limit switch LSh2 is examined at step 57. If the seat back $SB_{FR}$ is located at its forward tilting limit, the switch is turned on. In this instance, the operation of the switch S4a is cancelled. However, if the limit switch is off, one step energization of the motor M4 for rotation in the reverse direction takes place while monitoring the output pulse from the encoder En4 at steps 58 to 60. This causes the seat back $SB_{FR}$ to be tilted forwardly by one step, whereby the counter CN4 is decremented by one (the reclining direction being taken as the positive) at step 61

At step 62, the sliding limit which corresponds to the value in the counter CN4 or the reclining movement is read from the ROM table which represents the graph corresponding to the region A shown in FIG. 9, and is stored in the register R2a. As mentioned previously, the sliding limit represents the limit for the retracting movement when an occupant is seated upon the seat $ST_{RR}$. The described operation is repeated as long as the switch S4a remains on.

When an operation of the reclining switch S4b is detected at the step 63, the selector SLC1 is commanded to select an output from the encoder En4 and the selector SLC2 is commanded to select an output from the limit switch LSm4 at step 64. As mentioned previously, the reclining drive of the seat back $SB_{FR}$ is subject to a limitation when an occupant is seated upon the seat $ST_{RR}$. Specifically, the flag FG is examined at step 65, and when the flag is set, the value in the counter CN4 is compared against the value in the register R2b at step 66. The register R2b contains the reclining limit (the reclining limit when an occupant is seated upon the seat $ST_{RR}$) which corresponds to the prevailing sliding movement. Accordingly, if the value in the counter CN4 is equal to or greater than the value in the register R2b, any further driving of the seat back $SB_{FR}$ in the reclining direction causes part of the physical body of an occupant who is seated upon the seat $ST_{RR}$ to be oppressed, thus causing a failure to secure a seating space therefor, and accordingly the switch operation is cancelled.

When no occupant is seated upon the seat $ST_{RR}$ or the flag FG is reset to "0", or when an occupant is seated thereon but the reclining position of the seat back $SB_{FR}$ or the value in the counter CN4 is less than the reclining limit, the program proceeds to step 67 and subsequent steps. The limit switch LSm4 is examined at step 67. If the seat back $SB_{FR}$ is at its reclining limit, the switch is turned on. Accordingly, the operation of the switch S4b is cancelled. However, if the limit switch is off, one step energization of the motor M4 for rotation in the forward direction takes place while monitoring the output pulse from the encoder En4 at steps 68 to 70. This drives the seat back $SB_{FR}$ by one step in the reclining direction, whereby the counter CN4 is incremented by one at step 71.

Subsequently, at step 72, the sliding limit corresponding to the value in the counter CN4 or the reclining movement in the presence of an occupant on the seat $ST_{RR}$ is read from the ROM table and stored in the register R2a. The value contained in the register R2a is effective to limit the sliding movement of the seat $ST_{FR}$ when an occupant is seated upon the seat $ST_{RR}$. The described operation is repeated as long as the switch S4b remains on.

The above description of the embodiment only covered a control over driving the seat $ST_{FR}$, but it will be apparent that a similar control can be applied to any other seat.

It will also be apparent from the foregoing that with the apparatus of the invention, a retracting movement of a front seat or a reclining movement of its seat back is subject to limitation in the presence of an occupant on a rear seat, but that if the seat back has been retracted or reclined beyond the limit, there occurs no forced returning movement within the limit, thus avoiding any concern which an occupant seating on the front seat may experience.

As described, in accordance with the invention, in response to an input command to change the attitude of a first onboard seat, such attitude is controlled depending on the presence or absence of another occupant on a second onboard seat which is located immediately behind the first seat and in accordance with parameters associated with the attitude of the first onboard seat, thus taking the presence of an occupant on the second seat into the control of the attitude.

By way of example, as described in the embodiment, when an occupant is seated upon the second seat, a retracting limit and a reclining limit are established to inhibit a further rearward driving or a further reclining movement of the first seat beyond the respective limit. In this manner, if the driver seated upon the first seat commands a change in the attitude of his seat carelessly, forgetting the presence of an occupant on the second seat, the attitude of the first seat can be controlled without detracting from the comfortableness of the occupant seating on the second seat as by presenting an oppression upon his physical body or forcing a stressed attitude.

What is claimed is:

1. An attitude control apparatus for an onboard seat comprising:
   a first onboard seat;
   an attitude changing mechanism effective to change a position of the first onboard seat in the fore-and-aft direction including drive means for changing the attitude of the first onboard seat;
   input means for providing a command to change the attitude of the first onboard seat including:
      forward drive command input means for providing a command to drive the first onboard seat forwardly; and
      rear drive command input means for providing a command to drive the first onboard seat rearwardly; and
   attitude detecting means for detecting the attitude of the first onboard seat which detects the position of the first onboard seat in the fore-and-aft direction;
   a second onboard seat which is disposed behind the first onboard seat;

occupant detecting means for detecting the presence or absence of an occupant on the second onboard seat;

attitude control means responsive to a command from the input means for controlling the drive means of the attitude changing mechanism in accordance with the presence or absence of an occupant detected by the occupant detecting means and the attitude detected by the attitude detecting means, thereby controlling the attitude of the first onboard seat, including memory means which stores a rear limit for the first onboard seat, the attitude control means being responsive to a forward drive command for energizing the drive means of the fore-and-aft drive mechanism for driving the first onboard seat forwardly, the attitude control means being responsive to a rear drive command for energizing the drive means of the fore-and-aft drive mechanism to drive the first onboard seat rearwardly in the absence of an occupant detected by the occupant detecting means, the attitude control means being responsive to a rear drive command in the presence of an occupant detected by the occupant detecting means for energizing the drive means of the fore-and-aft drive mechanism to drive the first onboard seat rearwardly unless the fore-and-aft position of the first onboard seat detected by the attitude detecting means exceeds the rear limit.

2. An attitude control apparatus for an onboard seat comprising:

a first onboard seat;

an attitude changing mechanism including drive means for changing the attitude of the first onboard seat having a tilt drive mechanism for tilting the seat back of the first onboard seat back and forth;

input means for providing a command to change the attitude of the first onboard seat including:

a forward tilt command input means for providing a command to tilt the seat back forwardly; and rear tilt command input means for providing a command to tilt the seat back rearwardly, attitude detecting means for detecting the attitude of the first on-board seat which detects the tilting attitude of the seat back;

a second onboard seat which is disposed behind the first onboard seat;

occupant detecting means for detecting the presence or absence of an occupant on the second onboard seat; and attitude control means responsive to a command from the input means for controlling the drive means of the attitude changing mechanism in accordance with the presence or absence of an occupant detected by the occupant detecting means and the attitude detected by the attitude detecting means, thereby controlling the attitude of the first onboard seat, including memory means which stores a rear tilting limit for the seat back, the attitude control means being responsive to a forward tilt command for energizing the drive means of the tilt drive mechanism to tilt the seat back forwardly, the attitude control means being responsive to a rear tilt command for energizing the drive means of the tilt drive mechanism to tilt the seat back rearwardly in the absence of an occupant detected by the occupant detecting means, the attitude control means being responsive to a rear tilt command in the presence of an occupant detected by the occupant detecting means for energizing the drive means of the tilt drive mechanism to tilt the seat back rearwardly unless the tilting attitude detected by the attitude detecting means exceeds the rear tilt limit.

3. An attitude control apparatus for an onboard seat comprising:

a first onboard seat;

an attitude changing mechanism including drive means for changing the attitude of the first onboard seat including:

a fore-and-aft drive mechanism for changing the position of the first onboard seat fore and aft; and a tilt drive mechanism for tilting the seat back of the first onboard seat back and forth;

input means for providing a command to change the attitude of the first onboard seat including:

forward drive command input means for providing a command to drive the first onboard seat forwardly;

rear drive command input means for providing a command to drive the first onboard seat rearwardly;

forward tilt command input means for providing a command to tilt the seat back forwardly; and rear tilt command input means for providing a command to tilt the seat back rearwardly;

attitude detecting means for detecting the attitude of the first onboard seat operative to detect the position of the first onboard seat in the fore-and-aft direction and the tilting attitude of the seat back, a second onboard seat which is disposed behind the first onboard seat;

occupant detecting means for detecting the presence or absence of an occupant on the second onboard seat; and attitude control means responsive to a command from the input means for controlling the drive means of the attitude changing mechanism in accordance with the presence or absence of an occupant detected by the occupant detecting means and the attitude detected by the attitude detecting means, thereby controlling the attitude of the first onboard seat, including memory means which stores a rear limit for the first onboard seat and a rear tilting limit for the seat back, the attitude control of means being responsive to a forward drive command for energizing the drive means of the fore-and-aft drive mechanism to drive the first onboard seat forwardly, the attitude control means being responsive to a rear drive command for energizing the drive means of the fore-and-aft drive mechanism to drive the first onboard seat rearwardly in the absence of an occupant detected by the occupant detecting means, the attitude control means being responsive to a rear drive command in the presence of an occupant detected by the occupant detecting means for energizing the drive means of the fore-and-aft drive mechanism to drive the first onboard seat rearwardly unless the fore-and-aft position of the first onboard seat detected by the attitude detecting means has exceeded the rear limit, the attitude control means being responsive to a forward tilt command for energizing the drive means of the tilt drive mechanism to tilt the seat back forwardly, the attitude control means being responsive to a rear tilt command for energizing the drive means of the tilt drive mechanism to tilt the seat back rearwardly in the absence of an occupant detected by the occupant detecting means, the attitude control means being responsive to a rear tilt command in the presence of an occupant detected by the occupant detecting means for energizing the drive means of the tilt drive mechanism to tilt the seat back rearwardly unless the tilting attitude detected by the attitude detecting means has exceeded the rear tilt limit.

4. An attitude control apparatus according to claim 3 in which the memory means stores a plurality of rear limits for the first onboard seat and a plurality of rear tilting limits for the seat back which are related to the plurality of rear limits for the first seat, the attitude control means reading a particular one of the rear tilting limits which corresponds to the fore-and-aft position of the first seat detected by the attitude detecting means and also reading a particular one of the rear limits which corresponds to the tilting attitude detected by the attitude detecting means.

5. An attitude control apparatus for an onboard seat comprising:

a first onboard seat;

an attitude changing mechanism including drive means for changing the attitude of the first onboard seat;

input means for providing a command to change the attitude of the first onboard seat;

attitude detecting means for detecting the attitude of the first onboard seat;

a second onboard seat which is disposed behind the first onboard seat;

occupant detecting means for detecting the presence or absence of an occupant on the second onboard seat including:

a first and a second electrode insulated from each other and arranged such that at least part of an occupant present in the second onboard seat is disposed therebetween;

means for detecting a capacitance between the first and the second electrodes and providing a representative electrical signal;

processing means including storage means for storing the electrical signal;

storage update means for causing the electrical signal stored in the storage means to be updated at given time interval;

comparison means for producing an electrical signal representing the arrival of an occupant whenever a difference between the electronic signal developed by the capacitance detecting means and the signal stored by the storage means exceeds a first threshold value; and means for setting a second threshold value based on the capacitance detected during the presence of an occupant and for determining the departure of an occupant when the capacitance detected by the detecting means decreases below said second threshold value; and attitude control means responsive to a command from the input means for controlling the drive means of the attitude changing mechanism in accordance with the presence or absence of an occupant detected by the occupant detecting means and the attitude detected by the attitude detecting means, thereby controlling the attitude the first onboard seat.

6. An attitude control apparatus according to claim 5 in which the first electrode is mounted on part of the second onboard seat.

7. An attitude control apparatus according to claim 5 in which the decision means determines the presence of an occupant on the onboard seat in response to an increase in the capacitance detected.

* * * * *